Feb. 20, 1968     H. E. THOMASON     3,369,539
SOLAR HEAT TRAP
Filed Oct. 22, 1965
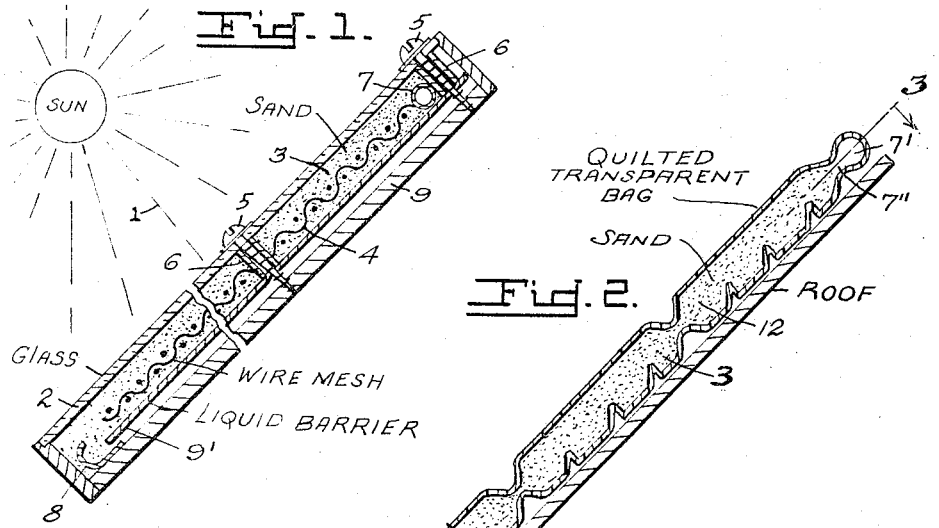
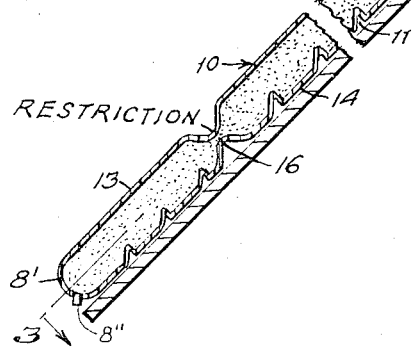
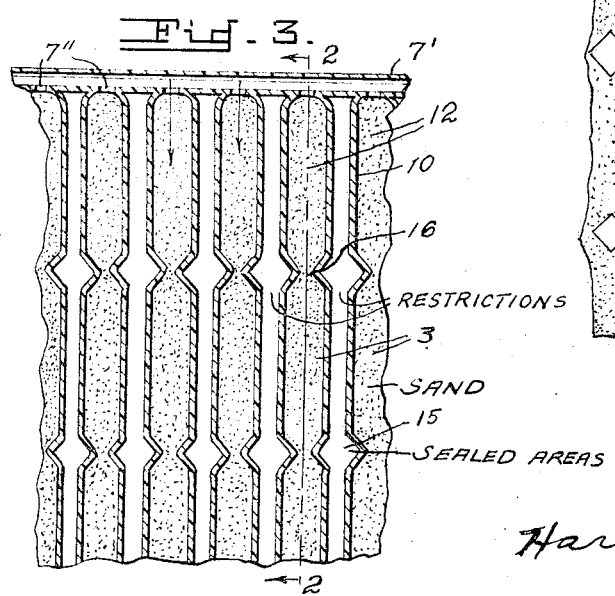
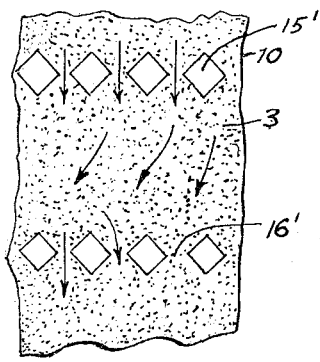
INVENTOR
Harry E. Thomason

United States Patent Office 3,369,539
Patented Feb. 20, 1968

3,369,539
SOLAR HEAT TRAP
Harry E. Thomason, District Heights, Md.
(6802 Walker Mill Road SE., Washington, D.C. 20027)
Filed Oct. 22, 1965, Ser. No. 501,965
8 Claims. (Cl. 126—271)

The present invention relates to an improved solar heat collector which is simple and low cost in construction, highly efficient in operation and which has a long life.

In the drawing:

FIG. 1 is a cross section through one form of the invention.

FIG. 2 is a cross section through a quilted solar heat collecting "bag" along line 2—2 of FIG. 3.

FIG. 3 is a view along line 3—3 of FIG. 2.

FIG. 3A is a view of a modified pattern of quilting.

In this invention solar rays 1 enter the solar heat trap or collector through substantially transparent or translucent cover transparency 2 and strike a heat collecting layer of bits of material, or dark sand or similar granular material 3. Other material such as bluestone chips may be used if desired. Either may be used with or without asphalt, coal tar or similar blackening binder.

The granular material, with or without the binder, has a tendency to slide or creep and flow toward the bottom of the collector if the incline is steep, for example, 30–90° commonly used for solar house heat collectors. This problem can be overcome by using mesh or such, as that illustrated at 4, to prevent sliding or creeping of the material. Water may be flowed through the trap to remove heat. If the mesh is wire, or other heat conducting material, it aids in transferring heat to the water from the heat collecting material.

If the incline of the collector is not too steep the wire mesh 4 is sufficient to prevent sliding or creeping, If the incline is very steep then the transparent member 2 itself together with securing screws 5 and spacer members 6, e.g. tubular bars, rectangular in cross-section, may be used to assist in reducing sliding and creeping. Liquid to be heated may be brought in at 7 and heated liquid may drain off through trough 8 and an outlet pipe (not shown) similar to 8″ in FIG. 2. Screws, bolts or such at 5 may be anchored to base 9, which may be insulating in nature.

In the modification of FIG. 2 the invention is reduced to a very simple form. Dark sand 3 is placed in a transparent bag 10. Liquid is introduced at 7′ to flow through passages 7″ down the incline to bottom 8′ and out at 8″. For some uses this apparatus can be laid out on a common roof of a building and the water warmed thereby piped to a point of use or storage, for swimming pool, or house, or domestic water heating, and so on. Even highly chlorinated swimming pool water does not attack the heat absorbing sand or the bag material. And, the "sand bag" secures itself to the roof without expensive anchoring means.

For collecting heat when the sun is high in the sky the heat collector operates efficiently even when placed on a near-level roof with no incline or only a slight incline. For such usage heavy dark granular material tends to remain in place, especially when the rate of liquid flow through the collector is moderate. If the collector is to be operated on a steeper incline, or with a high rate of liquid flow, means must be provided to keep the granular material from washing down to the lower edge of the bag. This may be accomplished by use of one or more of the following. As illustrated at 11, the inner surface of the bag may be roughened, or corrugated or serrated, somewhat at right angles to the direction of flow of the liquid therethrough. Mesh 4, as illustrated in FIG. 1, may be used. The bag may be quilted to provide a large number of individual smaller compartments or cells, each having dark granular or bits of material therein, with each cell having an inlet to admit liquid to be heated and an outlet for the heated liquid.

Two quilted patterns are illustrated in FIGS. 2, 3 and 3A. Liquid flow channels or cells 12 are formed by securing the top substantially transparent or translucent layer of material 13 to the bottom layer of material 14 at areas 15. Restricted areas 16 in channels or cells 12 permit liquid to flow therethrough but restrict flow, sliding or creeping of granular material 3. The sealed areas 15 also resist pressure of granular material 3 and prevent separation of materials 13 and 14.

FIG. 3A illustrates a second of the many possible patterns of quilting the bag and securing top material 13 to bottom material 14. Securing means 15′ leave restricted passages 16′ for retention of granular material 3 but permit flow of liquid past the securing means.

Although FIGS. 2, 3 and 3A are described hereinabove as illustrating a quilted bag heat collector, with or without wire mesh 4, the collector "bag" need not necessarily be made of one material only. As examples, the upper transparency 13 may be substantially clear plastic sealed, at areas 15 or 15′, to opaque, or black or reflectively coated plastic 14. Or, material 14 may be a metallic sheet, or some other watertight material. Or, transparent material 13 may be rigid, such as sheet plastic or glass, with material 14 secured thereto at areas 15 or 15′ and leaving passageways or cells as at 12 in FIGS. 2 and 3. Other variations may be made to simplify and facilitate manufacture, packaging, shipping, storage and so on.

The bag-type solar heat collector and sand-like material are fast and easy to install, on existing roofs for example, and resist deterioration. If desired, insulation may be provided beneath the bag, e.g., foam insulation or insulation beneath the roof. Also, another transparency may be provided above the bag if desired.

This type of trickle-flow collector avoids pressure build-up inside the apparatus as would occur in a closed collector. As an example, a closed collector, filled with water under static conditions, with a vertical distance of fifteen feet between the bottom and the water level at the top, would have a pressure of approximately one thousand pounds per square foot at the bottom, tending to burst the collector transparency, seals, and so on. No such bursting pressure occurs in the present apparatus.

However, it would be possible to produce liquid-tight apparatus and bring the liquid in at the bottom, to flow to the top as it is heated.

It would be possible to use the present invention where a gas, such as air, is heated, instead of a liquid. The gas to be heated would preferably be brought in near the bottom and the heated gas would be taken out near the top to take advantage of the natural tendency of the heated gas to rise.

This apparatus is exceptionally simple and low cost to manufacture. The granular material may be dark sand, for example, which has advantages such as low cost, permanency and resistance to rusting, corrosion or other deterioration. There is no chemical reaction between sand and the common transparent materials such as plastic films, glass, and so on. There is no chemical reaction between sand and most known heat transfer liquids or gases. Dark sand is a good collector of heat and transfers heat readily to liquid flowing therethrough. Sand is heavy in weight which, in many cases, avoids the necessity of using any other anchoring means to secure the collector to a roof or other flat or inclined support. The plumbing connections to the collector apparatus are exceptionally simple and low-cost to make because no pressure fittings or connections are necessary. Even the perforated pipe at the top and the collector gutter trough at the bottom may be dispensed with by forming the material 13, 14 to serve these functions as at 7', 8'.

The invention can be mass produced at very low cost by various techniques. As exemplary material 14 may be drawn from a roll while a hopper feeds thin parallel stripes of sand onto the upper surface. Simultaneously material 13 is drawn from a roll and is continuously sealed or attached to material 14 as at 15 or 15'. (If desired, wire mesh may be drawn from a third roll, sandwiched between 13 and 14, and attached to either or both, or neither, as desired.) The lower end of 13, 14 is closed except for one or more outlet holes 8''. The upper end of 13, 14 is sealed to form header tube 7' with restricted outlets 7''. An inlet pipe, not shown, is connected to header tube 7'.

I claim:

1. Solar heat collecting apparatus comprising substantially liquid tight apparatus of material having an upper layer exposed to incoming solar rays and a lower layer, said upper layer being substantially transparent or translucent to admit incoming solar rays and being secured to said lower layer in a quilted-like pattern to form cells, solar heat-absorbing granular material in said apparatus to receive and absorb incoming solar rays, opening means to admit a liquid to be heated to said apparatus and opening means for flow of heated liquid from said apparatus.

2. Apparatus as in claim 1 and means in said apparatus to prevent sliding or creeping of said granular material when the apparatus is placed on an inclined surface.

3. Solar heat collecting apparatus comprising a lower layer of substantially liquid tight material, solar heat-absorbing granular material above said lower layer, substantially transparent or translucent cover material above said solar heat-absorbing material, opening means to admit a liquid to be heated to said solar heat-absorbing granular material, opening means for flow of heated liquid from said apparatus, means securing said lower layer and said cover material in spaced relationship such that said granular material is restricted from sliding or creeping toward the bottom of said apparatus when the apparatus is placed in an inclined position, and mesh material in said granular material to reduce sliding or creeping of said granular material.

4. Apparatus as in claim 3 wherein said mesh is secured against movement relative to said other apparatus to further insure against sliding or creeping of said granular material.

5. Apparatus as in claim 3 wherein said mesh material is a heat conductor.

6. Solar heat collecting apparatus comprising a lower layer of substantially liquid tight material, a layer of bits of solar heat absorbing material covering a substantial portion of said lower layer, substantially transparent or translucent cover material above said solar heat absorbing material, opening means to admit a liquid to be heated to said heat absorbing material, opening means for flow of heated liquid from said apparatus, and securing means securing said lower layer and said substantially transparent or translucent cover material together in a quilted-like pattern to form cells, with said layer of bits of solar heat absorbing material being held in place in said cells by said securing means.

7. Apparatus as in claim 6 wherein each cell has an inlet and a restricted outlet permitting flow of liquid therethrough but retarding movement of the bits of solar heat absorbing material.

8. Apparatus as in claim 6 wherein said lower layer has a solar absorbing upper surface.

References Cited

UNITED STATES PATENTS

| 965,391 | 7/1910 | Little | 126—270 |
| 3,022,781 | 2/1962 | Andrassy | 126—271 |
| 3,064,418 | 11/1962 | Sanders | 126—270 X |

FOREIGN PATENTS

| 994,150 | 8/1951 | France. |

CHARLES J. MYHRE, *Primary Examiner.*